United States Patent [19]

Holycross, Jr.

[11] Patent Number: 4,577,835

[45] Date of Patent: Mar. 25, 1986

[54] INSERT FOR A FAUCET VALVE FOR INCREASING FLOW RATE

[75] Inventor: Frank R. Holycross, Jr., Batesville, Ind.

[73] Assignee: Masco Corporation of Indiana, Taylor, Mich.

[21] Appl. No.: 611,146

[22] Filed: May 17, 1984

[51] Int. Cl.$^4$ ............................................... F16K 5/04
[52] U.S. Cl. .................................. 251/310; 251/118; 251/357; 137/614.11
[58] Field of Search ............... 251/118, 207, 209, 310, 251/356, 357; 137/625.41, 614.11

[56] References Cited

U.S. PATENT DOCUMENTS

| | | | |
|---|---|---|---|
| 913,644 | 2/1909 | Kieren | 251/310 X |
| 3,645,493 | 2/1972 | Manoogian et al. | 251/310 X |
| 3,700,210 | 10/1972 | Manoogian et al. | 251/209 X |
| 4,058,289 | 11/1977 | Hicks | 251/209 X |
| 4,175,586 | 11/1979 | Hayman | 137/614.11 |
| 4,212,321 | 7/1980 | Hulsey | 251/209 X |
| 4,453,567 | 6/1984 | MacDonald | 137/614.11 |

Primary Examiner—A. Michael Chambers
Assistant Examiner—John C. Fox
Attorney, Agent, or Firm—Steven L. Permut; Malcolm L. Sutherland; Leon E. Redman

[57] ABSTRACT

A flow increasing insert member for a faucet valve body includes a notch therein. The insert member is sized to fit within a cavity passage in the valve body. The notch and the bottom surface of the cavity passage form a passage therethrough of lesser cross sectional area compared to the cavity passage and has a contoured surface to provide for a laminated and less turbulent flow as compared to the cavity passage. The insert member maintains the advantages of quiet opening of the valve body by not interfering with the function of the specifically shaped inlet through the bottom surface of the valve body. In addition, the insert member allows for restricted flow through a groove about the circumference of the valve body when in a partially open position.

6 Claims, 9 Drawing Figures

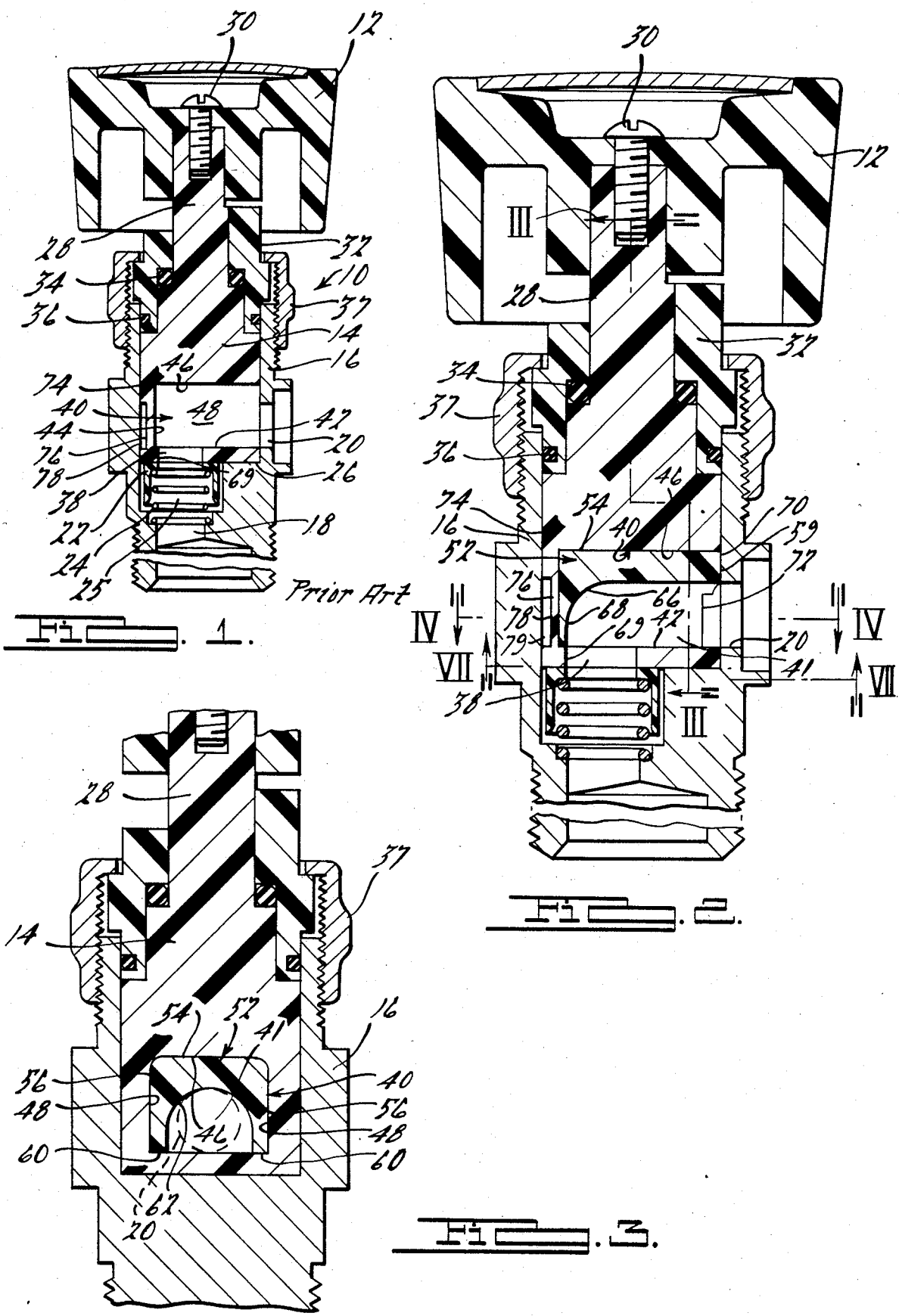

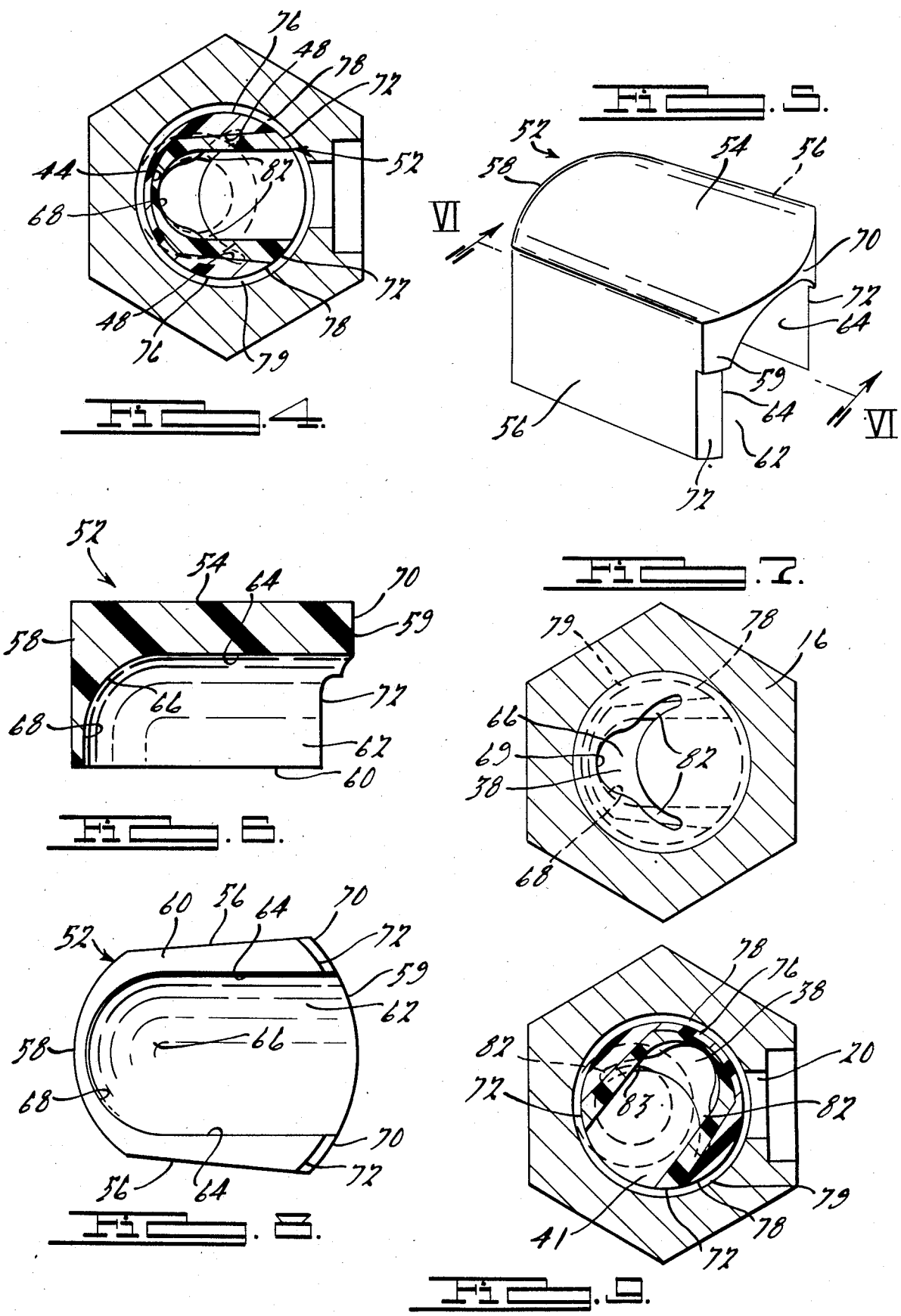

INSERT FOR A FAUCET VALVE FOR INCREASING FLOW RATE

TECHNICAL FIELD

This invention relates to faucet valves and more particularly to an insert member that fits within the faucet valve to increase the maximum flow rate.

DISCLOSURE INFORMATION

A faucet valve commonly has a housing that has an inlet port and an outlet port. A valve body is moveable within the housing between a closed position which blocks communication between the two ports and an open position which allows communication between the two ports. Often the communication is provided by a passage extending through the valve body. One such valve is disclosed in U.S. Pat. No. 3,645,493 issued on Feb. 29, 1972 to Manoogian et al.

Often, for reasons of manufacturing expediency, the passage within the valve body has a cross-sectional area that is substantially larger than either the inlet or outlet port. Furthermore, the passage may be L-shaped to provide passage from a horizontally disposed inlet to a vertically disposed outlet or vice versa. Because of the constraints imposed by the shapes of the inlets and outlets, the valve body passage restricts the flow therethrough.

The restricted flow is due, in part, to turbulence created in the sharp turn within the valve body. In addition, the large passage in the body allows for cavitation of the water which causes further flow restriction.

In certain situations, it is desirous to maximize the flow rate. A predetermined flow rate may either be dictated by governmental regulation, a plumber's association decree, or by customers' desires. The flow restrictions provided by the sharp turns and the cavitations are therefore undesirable.

One way to increase the flow rate would be to retool so that the valve body would have a contoured passageway that has a cross-section matching the cross-section of the inlet and outlet ports. The contours would be free of any sharp bends which would cause turbulence of the water.

However, retooling can be an expensive proposition. What is needed is an inexpensive, expeditious manner to increase the flow rate in existing valve bodies without the added expense of modifying the valve body itself.

SUMMARY OF THE INVENTION

According to one aspect of the invention, an insert member is provided for insertion into a cavity passage of a valve body to modify the shape and reduce the effective cross-sectional area of a cavity passage to an area comparable to an inlet port and outlet port in the faucet.

In one embodiment, the insert member has contoured walls forming a notch within the insert member. The contoured walls of the insert in conjunction with a wall of the valve body forms a passage of reduced cross-sectional area substantially equal to the area of the inlet at one end of the cavity passage and the outlet port in the faucet body at the other end of the cavity passage.

The insert member preferably has contoured walls to form a passage having a smooth transition from the vertical section adjacent one of the ports to a horizontal section adjacent the other of the ports. The contour is provided by a radius curve being defined by the free end of a radius when the other end of the radius is fixed with the radius pivoted on its fixed end. The radius curve preferably has a radius in the order of magnitude of the radius of the passage.

The insert provides for a smooth contoured passageway that creates a decreased amount of turbulence as compared to the cavity passage within which it is inserted. The reduced cross-sectional area reduces cavitation within the passage and the contoured walls promote a laminated flow rather than a turbulent flow. The combination of both of these aspects of contoured walls and reduced cross-sectional area provides for increased flow through the valve body when the valve body is in the fully opened position.

BRIEF DESCRIPTION OF THE DRAWINGS

Reference now will be made to the accompanying drawings in which:

FIG. 1 is an elevational sectional view through a conventional faucet valve;

FIG. 2 is an enlarged view of the valve shown in FIG. 1 with an insert according to the invention fitted within the cavity passage;

FIG. 3 is a fragmentary sectional view taken along the line III—III in FIG. 2;

FIG. 4 is a sectional view taken along line IV—IV shown in FIG. 2;

FIG. 5 is an enlarged perspective view of the insert member shown in FIG. 2;

FIG. 6 is an enlarged cross sectional view of the insert member taken along the line VI—VI in FIG. 5;

FIG. 7 is a bottom cross-sectional view taken along the line 7—7 in FIG. 2;

FIG. 8 is an enlarged bottom view of the insert member shown in FIG. 5; and

FIG. 9 is a view similar to FIG. 4 showing the valve in a partially open position.

DETAILED DESCRIPTION OF THE PREFERRED EMBODIMENT

Referring to FIG. 1, a conventional faucet valve 10 has a handle 12 connected to a valve body 14 which is rotatably mounted within the valve housing 16. The valve housing has an inlet port 18, and an outlet port 20. A sealing gasket 22 is spring biased by spring 24 within an enlarged counterbore portion 25 of inlet 18 to abut the bottom surface 26 of the valve body 14. The valve body 14 has an integral stem 28 which mounts the handle 12 via threaded fastener 30. The stem is rotatable within a fixed stop member 32 that seats two sealing rings 34 and 36. A cap 37 threads onto housing 16 to retain the stop member 32 and valve body 14 within housing 16. Within the valve body 14 is an inlet 38 leading to a cavity passage 40. The cavity passage 40 has bottom wall 42, a rear wall 44, top wall 46 and two side walls 48 as shown more clearly in FIG. 4. The cross-sectional area of cavity passage 40 as shown in FIG. 3, is substantially larger than the outlet port 20.

Referring now to FIGS. 2 through 9, an insert member 52 is positioned within cavity passage 40 of valve body 14. The insert 52 has a top wall 54, two side walls 56, a curved rear wall 58, and a bottom wall 60. The bottom wall 60 has a notch 62 therein which extends to a curved front wall 59. The notch 62 has a curved interior surface 64 with a radius section 66 curved about a radius approximately equal to the radius of the notch 62. The notch has a rear contoured surface section 68. The front wall 59 has an outwardly protruding upper section 70 and recessed lower section 72 which coincide with respective walls 74 and 76 in the valve body. Wall 76 is recessed with respect to wall 74 to form a groove 78 therein. The lower section 72 of wall 59, by being aligned with wall 76, continues the groove 78 to the edge of the notch 62 as more clearly shown in FIGS. 4 and 9.

The insert member 52 is positioned within the cavity passage 40 such that the bottom wall 42 of the cavity passage 40 and the contoured wall 64 within the notch forms a passage 41 of reduced diameter between the inlet 38 through wall 42 and the outlet port 20. The cross-sectional area of the passage 41 as shown in FIG. 3 more closely approximates the cross-sectional of the outlet port 20 and in addition, contoured rear surface section 68 aligns with the rear edge 69 of the inlet 38 such that a more laminated and less turbulent flow occurs through the passage 41.

By decreasing the cross-sectional area of the passage, there is less cavitation of the water. The contoured surface 64 by having a radius section 66 provides for more laminated flow and less turbulence. These factors help increase the flow through the valve body such that when the valve is in the fully open position as shown in FIGS. 2 and 4, the maximum flow rate is increased compared to the conventional valve shown in FIG. 1.

In addition, the insert 52 maintains the advantages of the valve shown in FIG. 1, namely the insert is shaped so as to provide the continuation of the restricted passage 79 provided by groove 78 between passage 41 and port 20. When a restricted flow is desired, the valve is moved to the partially open position, as shown in FIG. 9. The water must pass through the passage 41 then through passage 79 and to the outlet port 20.

Secondly, the inlet 38 can maintain its desired shape as shown in FIGS. 7 and 9 to provide for a quiet opening and closing of the valve. The inlet 38 has two arcuate tongue portions 82 that provide the inlet port to open into inlet 38 through a cracked opening 83 rather than a pinpoint opening when the valve body starts to open. The cracked opening 83 provides for a smoother, quieter, operation. The insert body does not interfere with the function of tongue portion 82.

The insert member 52 increases the flow rate in a valve body without the added expense of retooling or reshaping the valve body. None of the valve parts need reshaping. The insert member 52 is easily placed within the cavity passage 40 and is incapable of being mispositioned or removed once the valve body 14 is positioned within the faucet housing 16.

In this fashion, an insert member for a valve body provides for increased flow rate through an existing valve body without any expensive modifications to the valve body.

Variations and modifications of the present invention are possible without departing from its spirit and scope as defined by the appended claims.

The embodiments of the invention in which an exclusive property or privilege is claimed are defined as follows:

1. In a faucet having an inlet port, outlet port and a valve assembly having a cavity passage therethrough fluidically connecting said inlet port to said outlet port when said valve assembly is in an open position, said cavity passage having a side wall and an upper wall substantially transverse to said side wall, the improvement in the valve assembly characterized by:
    an insert member for insertion into said cavity passage;
    said insert member having contoured walls to form a passage having a smooth transition from a vertical section adjacent one of said ports to a horizontal section adjacent the other of said ports so that reduced turbulence results from the inlet port to the outlet port when said valve assembly is in the open position.

2. The valve assembly as defined in claim 1 wherein said contour is a radius curve.

3. The valve assembly as defined in claim 2 wherein said radius curve has a radius in the order of magnitude of a radius of said passage.

4. In a faucet having an inlet port, outlet port and a valve assembly having a cavity passage fluidically connecting said inlet port to said outlet port when said valve assembly is in an open position, said cavity passage having a cross sectional area greater than a cross sectional area of said inlet port or outlet port, the improvement in the valve assembly characterized by:
    an insert member for insertion into said cavity passage;
    said insert member having contoured walls to form a passage having a smooth transition from a vertical wall section adjacent one of said ports to a horizontal section adjacent the other of said ports so that a laminar flow results from the inlet port to the outlet port when said valve assembly is in the open position; and
    said passage through said insert member having a cross-sectional area comparable to said inlet port and outlet port to reduce cavitation in said passage as compared to the amount of cavitation in said valve assembly without said insert.

5. In a faucet body having a cylindrical bore therein; an inlet port opening into and offset from the axis of said bore and an outlet port; a valve assembly rotatable in said bore and having an inlet offset from the axis of rotation and a cavity passage extending laterally from said inlet; the improvement in the valve assembly characterized by:
    an insert member having contoured walls forming a notch within said insert member, said contoured walls in conjunction with a wall of said cavity passage forming a passage of reduced cross-sectional area substantially equal to the area of said inlet port at one end of said cavity passage and said outlet port at another end of said cavity passage.

6. The valve assembly as defined in claim 5 wherein said insert member has a front wall having a recessed portion to form a clearance between it and a wall of the bore in the faucet body.

* * * * *